US008220719B2

(12) United States Patent
Johnson, Jr. et al.

(10) Patent No.: US 8,220,719 B2
(45) Date of Patent: *Jul. 17, 2012

(54) RADIO FREQUENCY IDENTIFICATION (RFID) PAYMENT TERMINAL WITH DISPLAY-EMBEDDED RFID ANTENNA

(75) Inventors: William S. Johnson, Jr., Sunnyvale, CA (US); Hans Bielefeld Reisgies, San Jose, CA (US)

(73) Assignee: Vivotech, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/225,383

(22) Filed: Sep. 2, 2011

(65) Prior Publication Data

US 2011/0320295 A1 Dec. 29, 2011

Related U.S. Application Data

(63) Continuation of application No. 12/062,693, filed on Apr. 4, 2008, now Pat. No. 8,011,594.

(51) Int. Cl.
*G06K 19/06* (2006.01)

(52) U.S. Cl. ..................................................... 235/492

(58) Field of Classification Search .................. 349/152, 349/59; 340/572.8; 343/742; 361/679.26
See application file for complete search history.

(56) References Cited

U.S. PATENT DOCUMENTS

| 5,677,698 | A | 10/1997 | Snowdon |
| 5,716,451 | A | 2/1998 | Hama et al. |
| 5,899,549 | A * | 5/1999 | Nakanishi et al. ............... 349/59 |
| 6,677,906 | B2 | 1/2004 | Quinn et al. |
| 6,853,336 | B2 | 2/2005 | Asano et al. |
| 6,947,001 | B2 | 9/2005 | Finn et al. |
| 7,233,294 | B2 | 6/2007 | Fang |
| 7,283,037 | B2 | 10/2007 | Diorio et al. |
| 7,310,070 | B1 * | 12/2007 | Hardman et al. .............. 343/742 |
| 7,679,893 | B2 * | 3/2010 | Lam et al. ................ 361/679.26 |
| 2003/0050890 | A1 | 3/2003 | Itako |
| 2004/0189625 | A1 | 9/2004 | Sato |
| 2006/0033874 | A1 | 2/2006 | Sakama et al. |
| 2006/0157567 | A1 | 7/2006 | Baumann et al. |
| 2007/0296592 | A1 | 12/2007 | Huang et al. |
| 2009/0034843 | A1 * | 2/2009 | Wittkamper et al. ......... 382/181 |
| 2009/0254438 | A1 | 10/2009 | Johnson, Jr. et al. |

OTHER PUBLICATIONS

Notice of Allowance and Fee(s) Due for U.S. Appl. No. 12/062,693 (Apr. 29, 2011).
Interview Summary for U.S. Appl. No. 12/062,693 (Mar. 1, 2011).
Non-Final Official Action for U.S. Appl. No. 12/062,693 (Oct. 5, 2010).
"IBM AnyPlace Kiosk", (Aug. 2007).
Main, "Overview of Mobile Proximity Payment Issues and Recommendations," Mobile Payment Forum, pp. 1-22 (Jan. 16, 2007).

* cited by examiner

*Primary Examiner* — Steven S Paik
*Assistant Examiner* — Sonji Johnson
(74) *Attorney, Agent, or Firm* — Jenkins, Wilson, Taylor & Hunt, P.A.

(57) ABSTRACT

The subject matter described herein includes an RFID payment terminal with a display-embedded antenna. According to one aspect, an RFID payment terminal with a display-embedded antenna includes a display for graphically displaying payment information to a user. An RFID antenna is embedded in a portion of the display used for displaying the payment information to a user and for communicating with an RFID device of the user to receive transaction information form the RFID device. An RFID payment module is coupled to the antenna for receiving the transaction information and for effecting the payment transaction.

19 Claims, 6 Drawing Sheets

RADIO FREQUENCY IDENTIFICATION (RFID) PAYMENT TERMINAL WITH DISPLAY-EMBEDDED RFID ANTENNA

RELATED APPLICATION

This application is a continuation of U.S. patent application Ser. No. 12/062,693 (now U.S. Pat. No. 8,011,594), filed Apr. 4, 2008; the disclosure of which is incorporated herein by reference in its entirety.

TECHNICAL FIELD

The subject matter described herein relates to an RFID payment terminal with a display-embedded RFID antenna.

BACKGROUND

RFID technologies allow consumers to purchase goods and services and to collect and redeem tickets, coupons, or other items of worth with RFID devices. For example, credit card issuers such as MasterCard, Visa, Discover, and American Express issue RFID payment tags that allow users to initiate payment transactions. In addition, mobile phones now include RFID interfaces and can be provisioned with one or more credit cards implemented in software that can also be used for payment transactions. In order to initiate a payment transaction with an RFID device, the user brings the payment tag in the proximity of an RFID payment terminal or reader. The reader inductively couples to an antenna in the RFID payment tag to obtain transaction information, such as the account number and the cardholder ID, from the RFID payment tag.

Currently, customer facing displays in payment terminals in retail establishments are small enough so that the antenna in each payment terminal can be wrapped around the entirety of the display. However, display sizes are increasing so that more information can be graphically presented to the user. When display sizes become 5 inches or larger when measured on the diagonal, an RFID antenna, such as an ISO-14443 antenna, cannot generate sufficient magnetic field strength to communicate with the RFID tags. Accordingly, conventional designs where the antenna is wrapped around the display are unsuitable for the new larger size displays that will be appearing in RFID payment terminals.

Accordingly, there exists a need for an antenna arrangement suitable for use with RFID payment terminals with large size displays.

SUMMARY

The subject matter described herein includes an RFID payment terminal with a display-embedded antenna. According to one aspect, an RFID payment terminal with a display embedded antenna includes a display for graphically displaying payment information to a user. An RFID antenna is embedded in a portion of the display used for displaying the payment information to a user and for communicating, via a magnetic field, with an RFID device of the user to receive transaction information from the RFID device. An RFID payment module is coupled to the antenna while receiving the transaction information and for effecting the payment transaction.

BRIEF DESCRIPTION OF THE DRAWINGS

Preferred embodiments of the subject matter described herein will now be explained with reference to the accompanying drawings of which.

DETAILED DESCRIPTION

Figure 1:
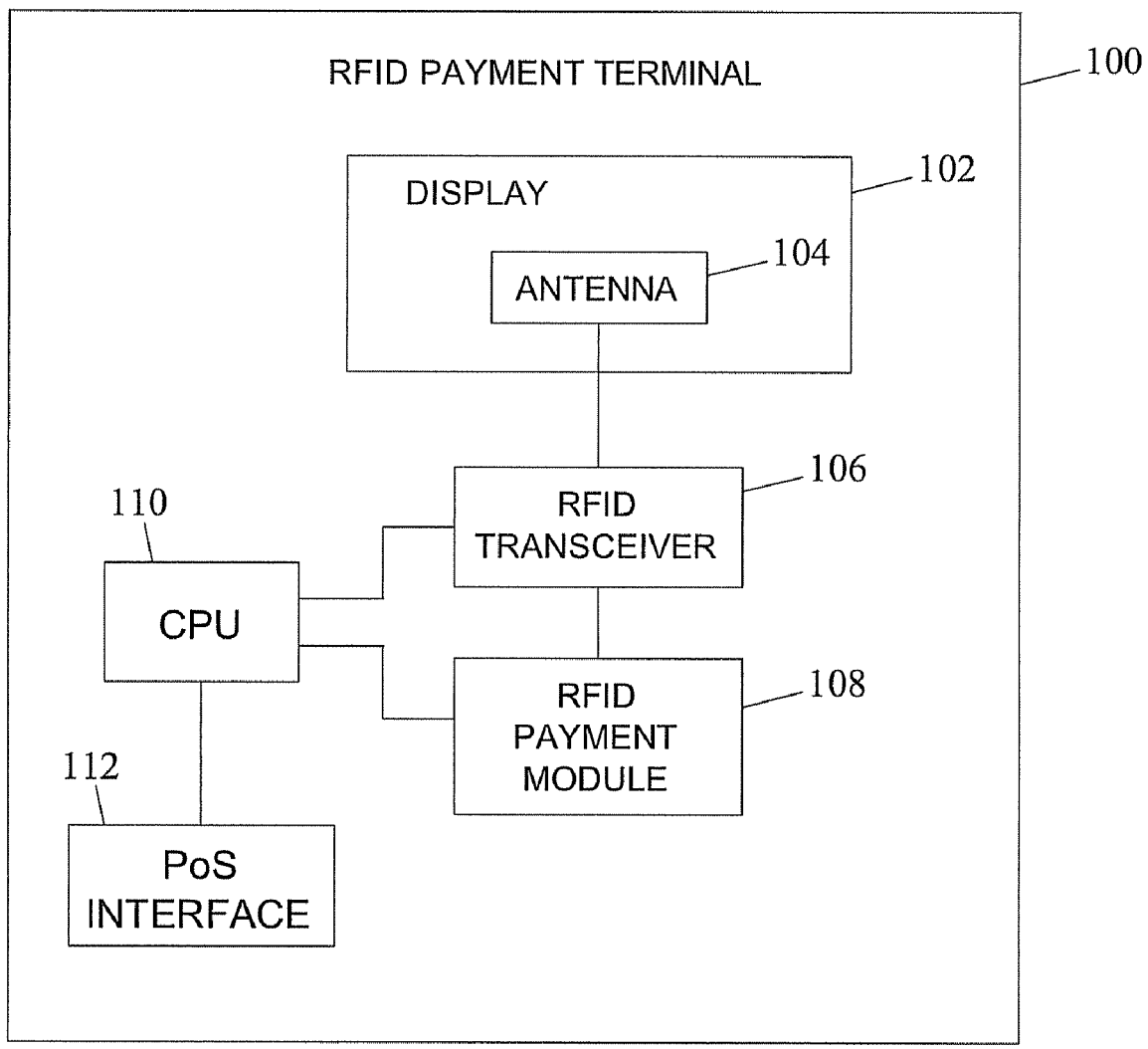
FIG. 1 is a block diagram of an RFID payment terminal with a display-embedded antenna according to an embodiment of the subject matter described herein.

The subject matter described herein includes an RFID payment terminal with a display-embedded antenna. Rather than wrapping around the perimeter of a display in a payment terminal, the antenna may be embedded in a portion of the display used to display payment information to the user. FIG. 1 is a block diagram illustrating an exemplary RFID payment terminal with a display embedded antenna according to an embodiment of the subject matter described herein. Referring to FIG. 1, RFID payment terminal 100 includes a display 102 for graphically displaying payment information to a user. Display 102 may be any suitable graphical display, such as a liquid crystal display (LCD) that may include a thin film transistor (TFT) material. An antenna 104 may be embedded in a portion of display 102 used to display the payment information to the user. Details of antenna 104 will be described below. An RFID transceiver 106 receives signals from antenna 104 and transmits signals to an RFID device via antenna 104. An RFID payment module 108 is coupled to the antenna and effects payment transactions based on signals received from RFID devices via the antenna. For example, RFID payment module 108 may receive transaction information, such as the account number and an identifier for an RFID device user. RFID payment module 108 may transmit this information to the RFID device issuer financial network along with the amount due for a particular transaction. The RFID device issuer network may validate the transaction using the information received from RFID payment module 108 and may send a message indicating that the transaction was successfully completed to RFID payment module 108. RFID payment module 108 may direct display 102 to display a message to the user indicating that the transaction was successfully completed.

RFID payment terminal 100 may also include a central processing unit (CPU) 110, and a point of sale (POS) interface 112. CPU 110 may control the overall operations of RFID payment terminal 100. PoS interface 112 may provide a serial interface, such as an RS-232 interface or a USB interface, for connecting RFID payment terminal 100 to a point of sale terminal. In an alternate implementation, PoS interface 112 may provide a parallel interface for connecting RFID payment terminal 100 to a point of sale terminal.

In one implementation, RFID transceiver 106 and CPU 110 may be semiconductor components mounted on a printed circuit board within RFID payment terminal 100. In an alternate implementation, RFID transceiver 106 and CPU 110 and any other electronic components of RFID payment terminal 100 may be affixed to a glass surface of display 102 using chip on glass technology.

Figure 2:
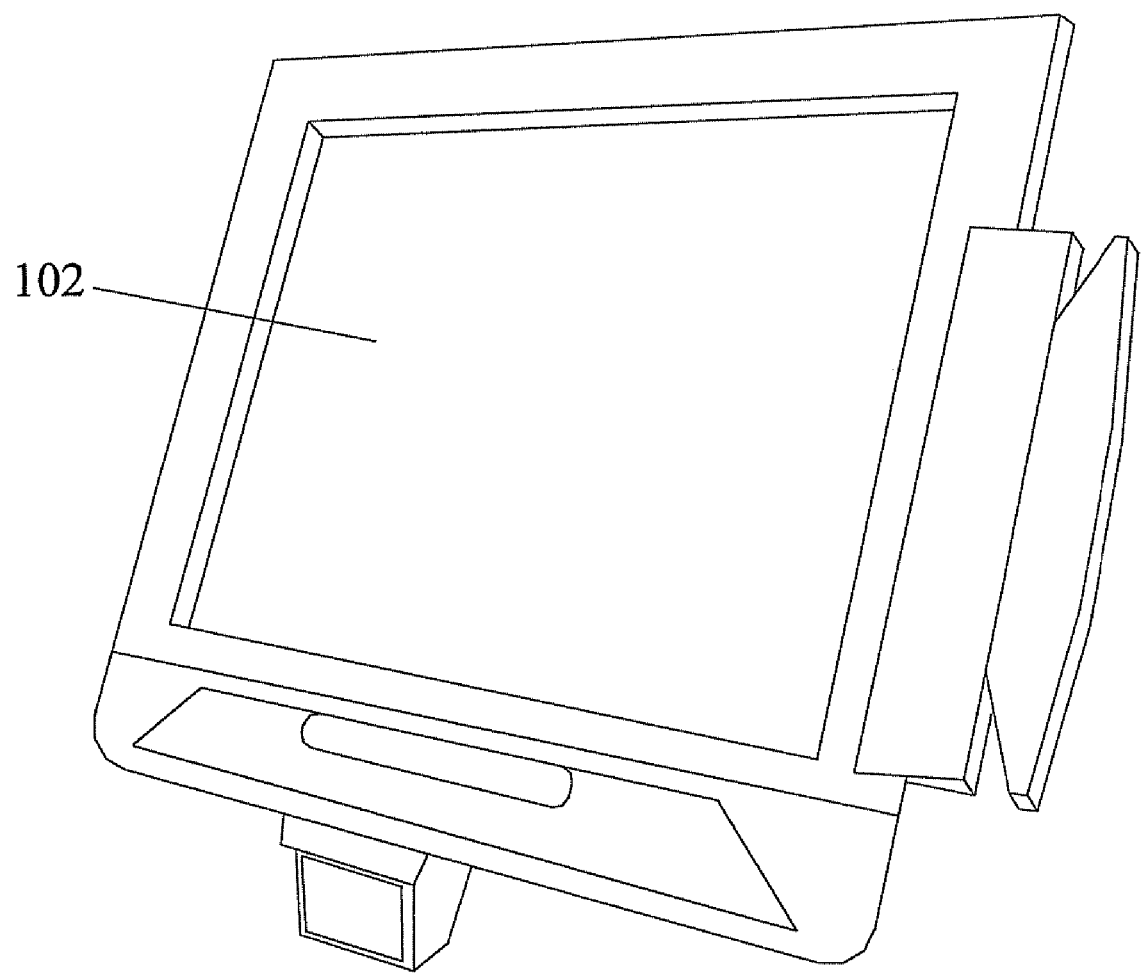
FIG. 2 is a perspective view illustrating an exemplary RFID payment terminal display in which an antenna may be embedded according to an embodiment of the subject matter described herein.

FIG. 2 is perspective view illustrating an exemplary RFID payment terminal display in which an antenna can be embedded according to an embodiment of the subject matter described herein. Referring to FIG. 2, display 102 displays payment information to a user. Display 102 may be one of the current larger customer facing displays for use at a point of sale terminal. For example, display 102 may be 17 inches or more when measured on the diagonal. Antenna 104 illustrated in FIG. 1 may be embedded in display 102. Although not illustrated in FIG. 2, an RFID payment terminal may also include a keypad for receiving additional information, such as a PIN or other information, from the user.

Figure 3:
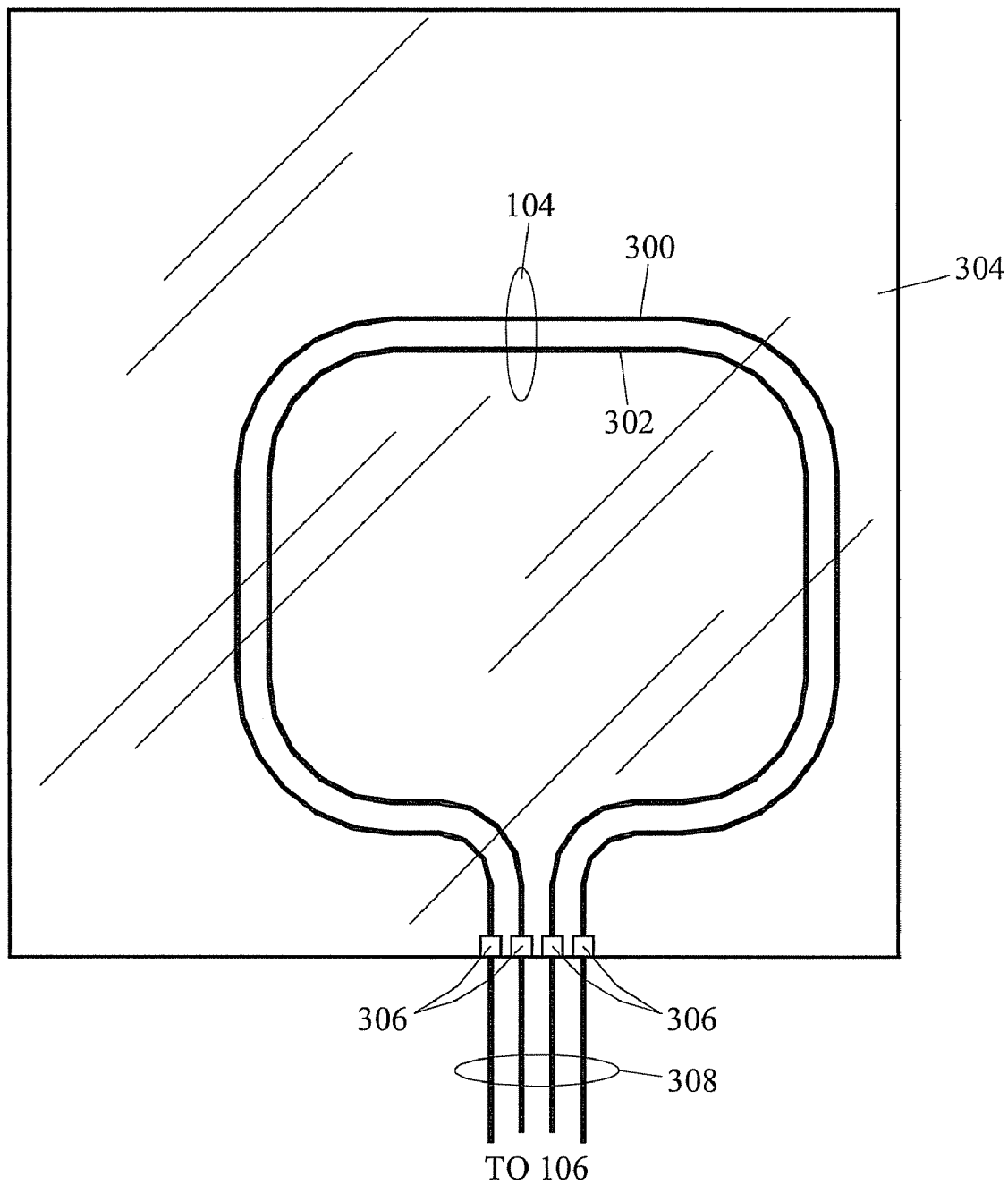
FIG. 3 is a plan view illustrating an exemplary display embedded antenna according to an embodiment of the subject matter described herein.

FIG. 3 is a plan view illustrating an exemplary antenna 104 embedded in a light transitive material of the display according to an embodiment of the subject matter described herein. Referring to FIG. 3, antenna 104 includes two conductors 300 and 302 that form concentric loops. In one embodiment, each trace may be about 1/16 inch wide and no more than about 10.7 inches long. Conductors 300 and 302 may be traces of a metal oxide material that are deposited on a surface of display glass 304 during an LCD manufacturing process. In an alternate implementation, conductors 300 and 302 may be wires that are adhesively attached to a surface of display glass 304. In order to hide conductors 300 and 302 when the display is backlit, the traces may follow pixel outlines i.e., may extend between adjacent pixels, on the LCD display. In an alternate implementation, conductors 300 and 302 may occlude at least some of the pixels of the display, and the occluded pixels may be turned off, i.e., not backlit, during at least a portion of the operation of the display. For example, the pixels that are occluded by the antenna may be turned off until the user is asked to bring an RFID payment device into the proximity of the antenna for payment. Turning the pixels off will make the conductors 300 and 302 invisible or at least not objectionable to the user. Conductors 300 and 302 may terminate in pads 306 that connect to conductors 308, which connect antenna 104 to antenna driver 106 illustrated in FIG. 1.

Antenna 104 may communicate with RFID payment devices, such as RFID-enabled cards, fobs, or phones, via a magnetic field, rather than an electric field. In order to reduce the electric field that would be produced by antenna 104 when communicating with and RFID device via a magnetic field, a grounded conductive shield may be placed over conductors 300 and 302 to reduce radiated electric field strength but not magnetic field strength. The grounded conductive shield may be formed on a sheet of Mylar or other light-transmissive material and may follow the outline of antenna 104. For example, if conductors 300 and 302 are each 1/16 inches wide and separated from each other by 1/16 inch, the shielding conductor may be at least about 3/16 inches wide. The shield conductor may be formed of a non-ferrous conductive material, such as a non-ferrous metal oxide.

Figure 4:
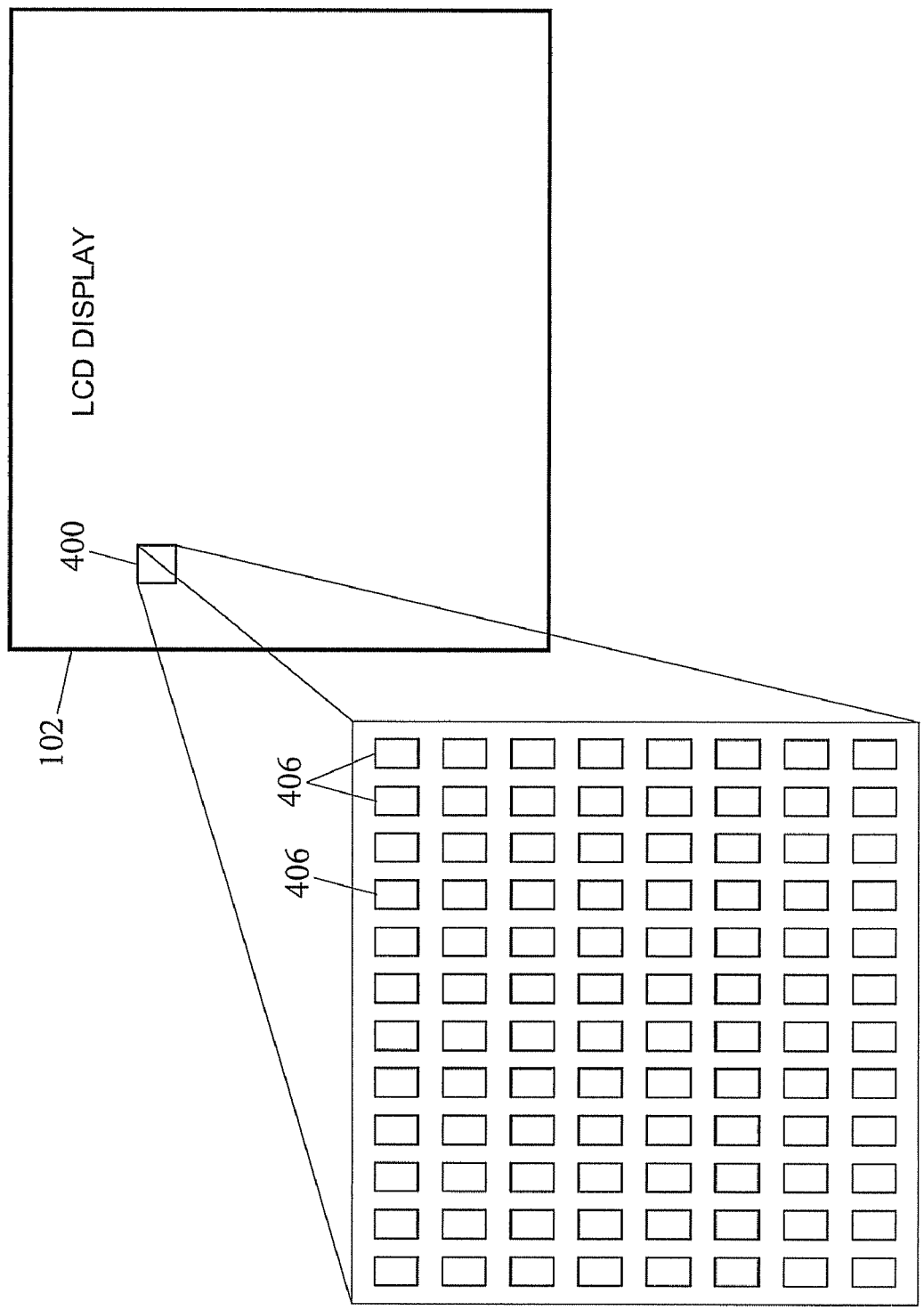
FIG. 4 is a plan view of an LCD display with an enlarged view of display pixels according to an embodiment of the subject matter described herein.
Figure 5:
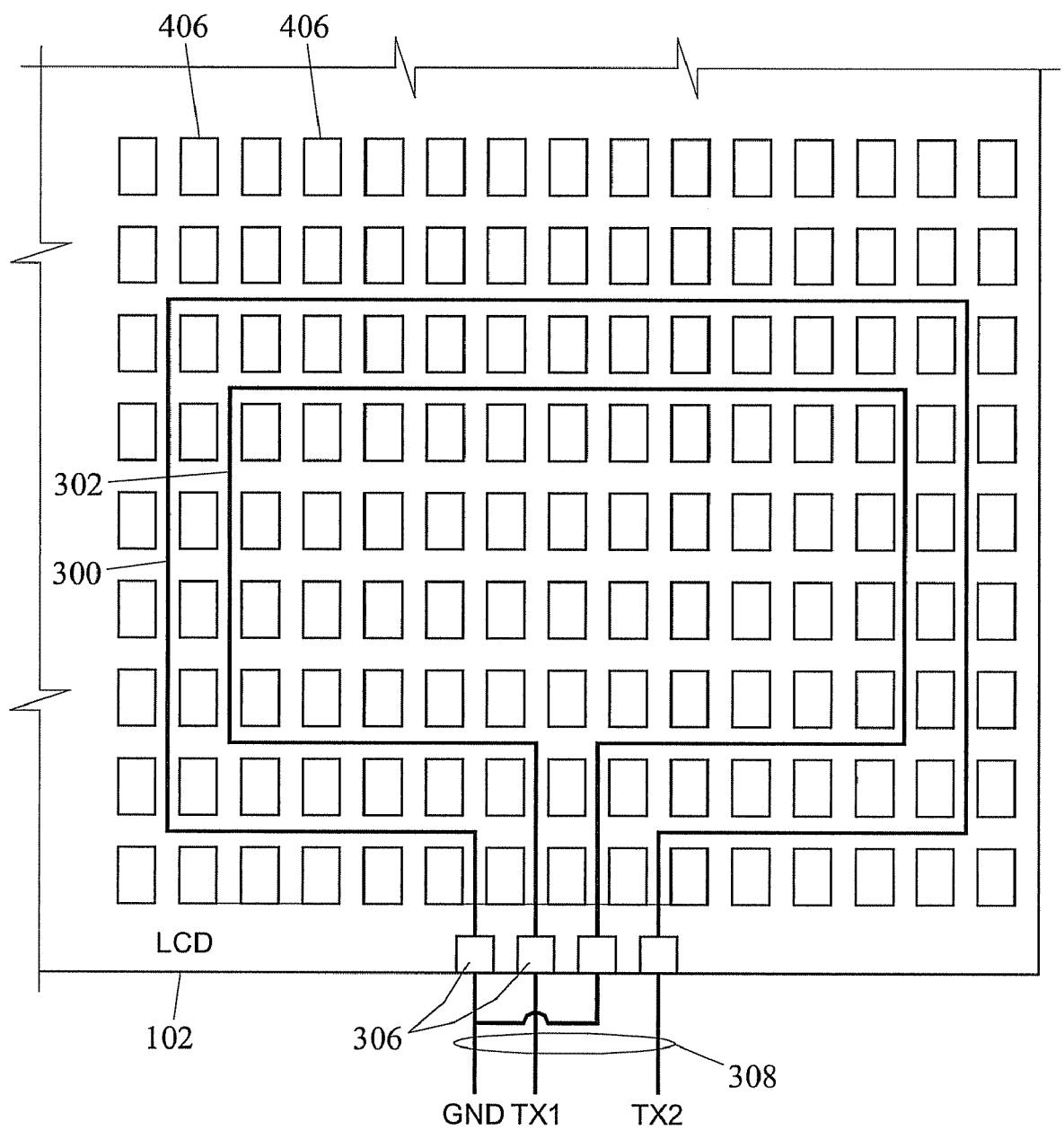
FIG. 5 is a plan view illustrating an LCD display, display pixels, and an embedded RFID antenna according to an embodiment of the subject matter described herein.

As stated above, one type of display in which antenna 104 may be embedded is an LCD display. FIG. 4 is a plan view illustrating an LCD display according to an embodiment of the subject matter described herein. Referring to FIG. 4, a magnified view of a portion 400 of display 102 is presented. In the magnified view, display pixels 406 are illustrated. As described above, in one implementation, antenna 104 may follow pixel outlines. This is illustrated in FIG. 5. Referring to FIG. 5, pixels 406 form a grid pattern in display 102. Conductors 300 and 302 are formed between adjacent pixels in display 102 to avoid being backlit when back illumination is applied to display 102.

As stated above, in an alternate implementation conductors 300 and 302 may occlude some pixels 406, and the occluded pixels may be turned off during at least a portion of the operation of payment terminal 100.

Figure 6B:
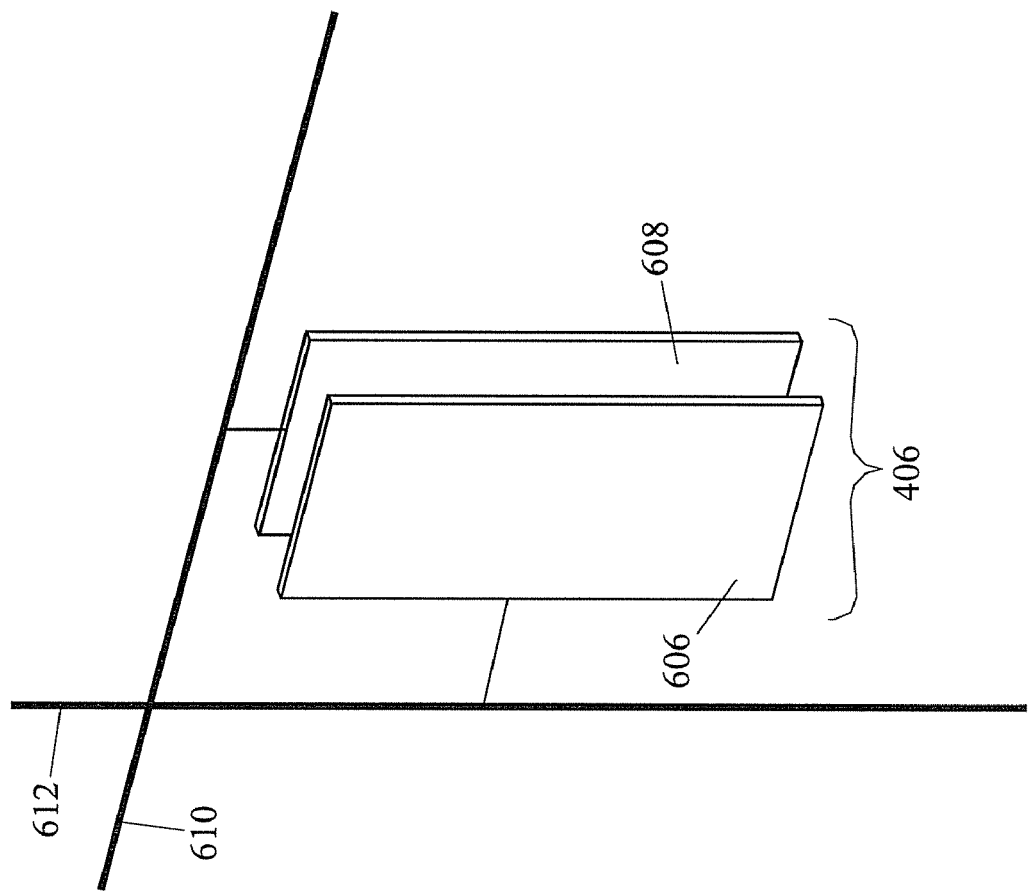
FIG. 6B is a perspective view of a display pixel, a row driver, and a column driver of an LCD display according to an embodiment of the subject matter described herein.
Figure 6A:
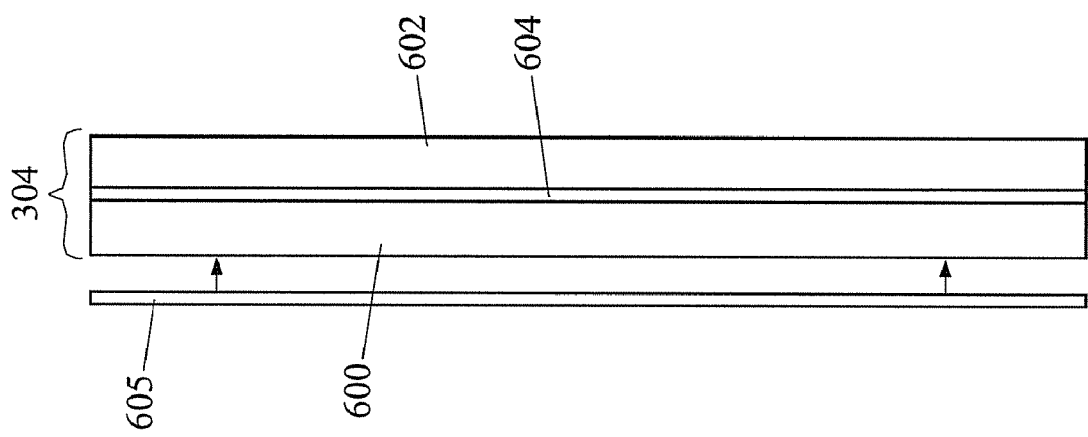
FIG. 6A is a sectional side view of an LCD display illustrating front and back glass plates and an intermediate layer where LCD material can be embedded according to an embodiment of the subject matter described herein.

FIGS. 6A and 6B illustrate display glass 304 in more detail. More particularly, FIG. 6A is a sectional view illustrating front glass 600, back glass 602 and LCD material layer 604 of display 102. Pixels 406 and antenna 104 may be formed on the surface of front or back glass 600 or 602 that faces LCD material layer 604. In an alternate implementation, antenna 104 may be located on an outer surface of front or back glass 600 or 602 to avoid interfering with the LCD material in LCD material layer 604. In yet another alternate implementation, antenna 104 may be located on a film 605 that may be located on either the front or back surface of display glass 600 that faces the user. Film 605 may be a polarizing film, a scratch resistant film, or other film that is attached to the surface of display glass 600 to protect glass 600 or improve display viewability. FIG. 6B illustrates a pixel 406 in more detail. Pixel 406 includes a front plate 606 that is formed on a surface of front glass 600 that faces layer 604 (illustrated in FIG. 6A) and a back plate 608 formed on a surface of back glass 602 that faces layer 604. Drivers 610 and 612 apply voltage to plates 606 and 608 and energize pixel 406 for display. Antenna 104 may be formed in the same plane as plate 606 or plate 608. In addition, rather than being energized by row and column drivers 610 and 612, antenna 104 may be energized by RFID transceiver 106 illustrated in FIG. 1.

As stated above, chip on glass technology may be used to embed an integrated circuit in display glass 304 to enhance the functionality of payment terminal 100. For example, the embedded integrated circuit may be coupled to antenna 104 and may assist with the payment transaction by performing some or all of the operations described above with respect to payment module 108. That is, payment module 108 may be implemented in whole or in part by an integrated circuit embedded in an LCD display. Alternatively, payment module 108 may be implemented in hardware, software, firmware, or any combination thereof implemented with the housing of payment terminal 100.

Although the embodiments described above relate to an antenna embedded in the display glass of a payment terminal for receiving payment information from a user, the subject matter described herein is not limited to receiving payment information. For example, the antenna may be used to collect tickets, coupons, or other items of worth from a user. The term "transaction information," as used herein, is intended to refer to any or all of these types of information.

In operation, display 102 may display a graphical indication of where the user should present his or her RFID payment device and to indicate different credit card logos corresponding to cards or RFID devices accepted for payment to the user. When the user brings his or her RFID payment device in the proximity of terminal 100, antenna 104 may read transaction information from the RFID payment device. Display 102 may then display to the user that the card was correctly read. The user may be prompted for additional information. Once payment terminal 100 receives all the information, payment terminal 100 effects the payment transaction in conjunction with the card issuer financial network as described above.

What is claimed is:

1. A radio frequency identification (RFID) transaction terminal comprising:

a display for graphically displaying transaction information to a user;

an RFID antenna embedded in a portion of the display used for displaying the transaction information to the user and for communicating, via a magnetic field, with an RFID device of the user to receive transaction information from the RFID device;

an RFID module coupled to the antenna for receiving the transaction information and for effecting a transaction using the transaction information; and wherein the display includes a plurality of pixels and wherein the RFID antenna includes at least one conductor that extends between at least two of the pixels of the display.

2. The RFID transaction terminal of claim 1 wherein the display comprises a liquid crystal display (LCD).

3. The RFID transaction terminal of claim 2 wherein the at least one conductor is located on a surface of the LCD display.

4. The RFID transaction terminal of claim 3 the LCD display includes first and second glass plates located on opposite sides of a liquid crystal material, wherein the conductors are located on a surface of one of the first and second glass plates that faces the liquid crystal material.

5. The RFID transaction terminal of claim 4 wherein comprising a grounded conductive shield located between the first and second glass plates and following paths of the first and second traces to reduce electric field strength generated by the traces during operation.

6. The RFID transaction terminal of claim 3 the LCD display includes first and second glass plates located on opposite sides of a liquid crystal material, wherein the at least one conductor is located on an outer surface of one of the glass plates so as not to interfere with the liquid crystal material and in such a position that the traces not visible because the at least one conductor is interwoven between the display pixels.

7. The RFID transaction terminal of claim 3 the LCD display includes first and second glass plates located on opposite sides of a liquid crystal material, wherein the at least one conductor is located on an outer surface of one of the glass plates in such a way that the at least one conductor is not objectionable to a display user.

8. The RFID transaction terminal of claim 7 wherein the at least one conductor occludes at least some of the pixels of the display, wherein the display is adapted to turn the pixels occluded by the at least one conductor off during at least a portion of operation of the RFID payment terminal.

9. The RFID transaction terminal of claim 3 wherein the at least one conductor comprises wires located on the surface of the LCD display.

10. The RFID transaction terminal of claim 3 wherein the at least one conductor comprises traces of thin film deposited on the surface of the LCD display.

11. The RFID transaction terminal of claim 3 wherein the display includes:

first and second glass plates;

a liquid crystal material located between the glass plates; and a film located on a surface of one of the glass plates, wherein the at least one conductor is located on a surface of the film.

12. The RFID transaction terminal of claim 3 wherein the at least one conductor extends between adjacent pixels of the LCD display.

13. The RFID transaction terminal of claim 3 wherein the at least one conductor comprises a plurality of conductors that form loops that extend parallel to each other.

14. The RFID transaction terminal of claim 3 wherein the at least one conductor comprises a metal oxide material.

15. The RFID transaction terminal of claim 3 wherein the at least one conductor is about 1/16 inches in width.

16. The RFID transaction terminal of claim 3 wherein the at least one conductor is no more than about 10.7 inches in length.

17. The RFID transaction terminal of claim 1 wherein the display comprises a thin film transistor (TFT) display.

18. The RFID transaction terminal of claim 1 wherein the display is at least about 5 inches when measured along a diagonal of the display.

19. The RFID transaction terminal of claim 1 wherein the transaction information includes tickets or coupons.

* * * * *